(12) United States Patent
Lindquist et al.

(10) Patent No.: US 7,797,182 B2
(45) Date of Patent: Sep. 14, 2010

(54) METHOD AND APPARATUS FOR IMPROVED FORECASTING USING MULTIPLE SOURCES

(75) Inventors: Erik Anson Lindquist, Burlingame, CA (US); Stratton Carpenter Lloyd, Seattle, WA (US); Jeffrey McCormick Summers, Wheaton, IL (US)

(73) Assignee: Siebel Systems, Inc., San Mateo, CA (US)

( * ) Notice: Subject to any disclaimer, the term of this patent is extended or adjusted under 35 U.S.C. 154(b) by 1335 days.

(21) Appl. No.: 10/335,016

(22) Filed: Dec. 31, 2002

(65) Prior Publication Data

US 2007/0265904 A1 Nov. 15, 2007

(51) Int. Cl.
 *G06F 17/30* (2006.01)
(52) U.S. Cl. ............................... 705/10; 705/9
(58) Field of Classification Search ............ 705/7, 705/8, 10, 11
See application file for complete search history.

(56) References Cited

U.S. PATENT DOCUMENTS

| | | | |
|---|---|---|---|
| 5,249,300 A | 9/1993 | Bachman et al. | |
| 5,461,699 A * | 10/1995 | Arbabi et al. | 706/21 |
| 5,615,109 A * | 3/1997 | Eder | 705/8 |
| 6,609,101 B1 * | 8/2003 | Landvater | 705/10 |
| 6,665,648 B2 * | 12/2003 | Brodersen et al. | 705/7 |
| 6,684,388 B1 | 1/2004 | Gupta et al. | |
| 6,804,657 B1 * | 10/2004 | Sultan | 705/10 |
| 7,080,026 B2 * | 7/2006 | Singh et al. | 705/10 |
| 7,171,379 B2 * | 1/2007 | Menninger et al. | 705/28 |
| 2002/0049622 A1 * | 4/2002 | Lettich et al. | 705/7 |
| 2002/0169657 A1 * | 11/2002 | Singh et al. | 705/10 |
| 2002/0174005 A1 * | 11/2002 | Chappel | 705/10 |
| 2007/0225949 A1 | 9/2007 | Sundararajan et al. | 703/2 |

OTHER PUBLICATIONS

PR Newswire, "Syspro Launches Version 4 of IMPACT Encore ERP Software", New York, Mar. 15, 1999, pg. 1.*
Goodman et al, "An Ecological Assessment of Community-Based Interventions for Prevention and Health Promotion: Approaches to Measuring Community Coalitions", American Journal of Community Psychology, vol. 24, No. 1, 1996.*
"Develop effective operating plans with accurate long-term revenue forecasts," SPSS, 2001, 2 pgs.

* cited by examiner

*Primary Examiner*—Jonathan G. Sterrett
*Assistant Examiner*—Thomas Mansfield
(74) *Attorney, Agent, or Firm*—Campbell Stephenson LLP

(57) ABSTRACT

A method and apparatus for providing a triangulated forecast comprises receiving a sales forecasts from at least three sources, and triangulating the sales forecasts to obtain a triangulated forecast. The method further comprises presenting the resulting triangulated forecast.

36 Claims, 10 Drawing Sheets

METHOD AND APPARATUS FOR IMPROVED FORECASTING USING MULTIPLE SOURCES

FIELD OF THE INVENTION

The present invention relates to forecasting, and more specifically to using multiple sources of data for forecasting.

BACKGROUND

Revenue forecasts are the foundation of every company's business plans. Accurate forecasts enable you to: maintain appropriate staffing levels, set realistic sales targets, create effective marketing promotion mixes, build budgets that match operating expenses, and keep inventory at the right level to meet, but not exceed, customer demand.

However, producing such forecasts is usually a tedious and time consuming process. In general, a bottom-up forecasting process is used. The sales personnel create a personal forecast, estimating how much business will be closed by the end of the period. This is then forwarded to their managers, who create a combined estimate for all personnel under them, factoring in additional knowledge and personnel evaluations. This process is repeated, until the forecast reaches the vice-president, or appropriate person in charge.

The entire process generally takes five to seven days, and in a large organization may take up to a month. While such time-spans are acceptable for annual forecasts done at the beginning of the year, they are not appropriate for end-of-quarter evaluations.

Thus, a process that would make forecasting more efficient and more accurate would be advantageous.

SUMMARY OF THE INVENTION

A method and apparatus for providing a triangulated forecast comprises receiving a sales forecasts from at least three sources, and triangulating the sales forecasts to obtain a triangulated forecast. The method further comprises presenting the resulting triangulated forecast.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
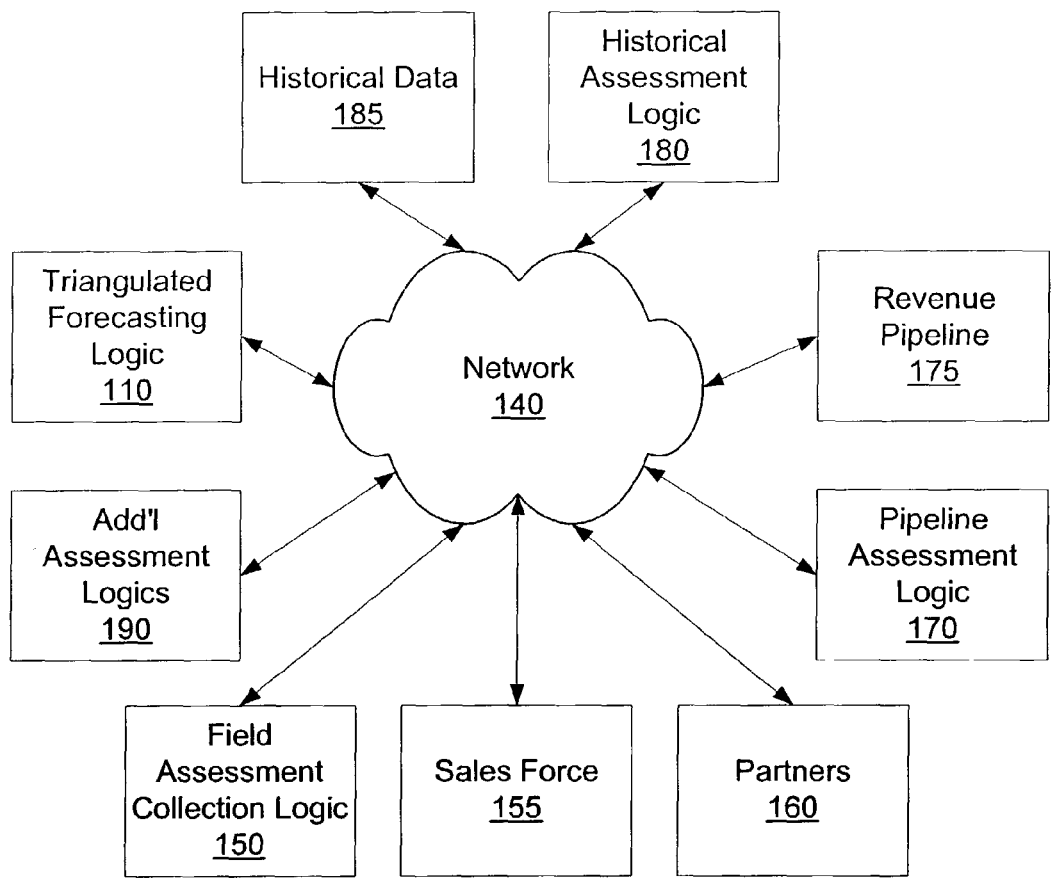
FIG. 1 is a block diagram of one embodiment of a network over which the present invention may be implemented.

A method and apparatus for an improved method and apparatus of forecasting is described. The improved process uses multiple information sources to provide a more accurate revenue assessment. Additionally, the process is integrated, such that there is transparency at any level, providing the recipient with the ability to evaluate where under-performance originates, and how to improve performance overall. Furthermore, in one embodiment, the transparency enables projections beyond the current period, by using pipeline forecasting. Furthermore, the present technique, for one embodiment, permits a multi-channel evaluation across all processes and taking into account all sales channels and all revenue generation methods. Additionally, the present technique can reduce the time to generate a forecast from days and weeks to hours. By automating much of the process, the present forecasting system provides a significant improvement in timeliness, efficiency, and accuracy of the forecasts generated.

The present process uses a triangulated forecasting methodology, which takes data from multiple sources, and integrates that data to provide an accurate and speedy forecast. For one embodiment, the sources may include: a field assessment, a pipeline assessment, and a historical assessment.

The Field Assessment includes the traditional sales force "roll-up" forecast process in which sales representatives (individual contributors) compile information about the opportunities they will forecast make necessary adjustments to the information and submit (or "roll-up") this forecast to their managers. For one embodiment, the forecast contained in the field assessment contains multiple dimensions including but not limited to account name, product, product quantity, expected revenue, close date, sales stage, probability of close, best case revenue, worst case revenue, cost, and margin. For one embodiment, additional forecast information comes from channels, including partners, distributors, wholesalers, etc. For one embodiment, the field assessment process is automated. For one embodiment, the Field assessment may include auto forecast, recurring revenue support, revenue plans, revenue splits. The Field Assessment may further include multiple different ways of forecasting, such as global snapshots and hybrid roll ups, in addition to the standard roll up. This process is described in more detail below.

The Pipeline Assessment is a summary of the total revenue pipeline. The assessment may be based on sales stages, revenue class, revenue type, business unit, product line, or whatever qualifying attribute provides the level of detail into the pipeline preferred by the user. The pipeline assessment type is chosen by the user. This assessment is automatically generated, for one embodiment, based on the sales data available within the integrated Sales System. The pipeline assessment can optionally be graphically displayed in the funnel chart (shown in FIG. 9), which shows all of these subtotals by sales stage and compares them against pre-defined pipeline targets to generate "Percent Pipeline Coverage" for each sales stage.

The Historic Assessment is an extrapolation of historical data and historical trends that predicts the final attainment of a sales organization at the end of the month, quarter, or year. This data is typically evaluated in the same time dimension and can include Forecast vs. Quota, Forecast vs. Actual, Forecast vs. Pipeline, et al. Trends can include seasonality, demographic skew, geographic skew, time series, et al. For one embodiment, the forecast extrapolation is adjusted for these trends and for data outliers and data anomalies that might produce misguided predictive data elements. The Historic Assessment gives users immediate insight into this historical data and the associated trends.

The forecasting system of the present invention integrates these, or an alternative set, of three or more information sources to generate an accurate forecast based on the information available.

FIG. 1 is a block diagram of one embodiment of a network over which the present invention may be implemented. The triangulated forecasting logic 110 receives sales forecast information from at least three forecasting logics. For one embodiment, the forecasting logics include field assessment collection logic 150, pipeline assessment logic 170, historical assessment logic 180, and additional assessment logics 190.

The field assessment collection logic 150 receives field assessment data from the sales force 155 and partners 160. The sales force 155 and partners 160 for one embodiment include all relevant channels of income.

Partners 160 may include data sources such as retailers, distributors, warehousers, franchisees, and other potential data sources. The term "partner 160" is used herein to refer to any entity not directly within the corporation that can provide relevant data. The system may be set up to request and integrate data from as many of these partners 160 as the user prefers.

For one embodiment, the sales force 155 and partners 160 may generate their forecast while not connected to the network 140. This remote processing permits partners who are not part of the network 140 to generate an internal field assessment, and then, when the partner 160 connects to the network, synchronize the forecast data with field assessment collection logic 150. Field assessment collection logic 150 further rolls up the field assessments received from the sales force 155 and partners 160 through the managers. The final field assessment is sent to triangulated forecasting logic 110. For one embodiment, the field assessment is also sent to historical assessment logic 180.

Pipeline assessment logic 170 receives data from the revenue pipeline 175. The revenue pipeline is regularly updated by the sales force 155, and includes all current opportunities, the stage at which each of those opportunities is, and the estimated total value of each opportunity. The pipeline assessment logic 170 further receives targets for each stage of the pipeline. Stages, in this context, mean sales phases, such as "lead generation, short list, selected vendor, negotiation, closed/won contract." Note that these phases are merely exemplary, and each corporation may define its own phases, and the preferred evaluation of an opportunity. The pipeline assessment logic 170 compares the revenue pipeline with the targets for each stage, and generates a comparative chart. For one embodiment, the pipeline assessment logic 170 may generate a visual representation of this pipeline. The pipeline data is then sent to the triangulated forecasting logic 110. For on embodiment, the pipeline data is further sent to the historical assessment logic 180.

Additional assessment logics 190 may perform additional types of sales assessments, now known in the art, or later discovered.

The historical assessment logic 180 uses historical data 185 to evaluate the expected accuracy of other forecasts. For one embodiment, historical data 185 may be obtained from a data warehouse. Alternatively, historical data may be extracted from other sources, such as Excel data sheets, on-line transaction processing (OLTP) systems, on-line analytical processing (OLAP) systems, or other systems that store historical data. For one embodiment, open database connectivity (ODBC) is used to map this historical data to metadata useable by the historical assessment logic 180. For one embodiment, the data may be transformed and stored as historical data 185 in a data warehouse.

For one embodiment, the historical data is used by historical assessment logic 180 to create a forecast based on history and trends, and then adjust for future growth or market share projections. For one embodiment, the historical assessment logic 180 may compensate for expected revenue lifts from marketing, expansion, or other future events. For example, the information that there will be a 2-for-1 sale in the first week of February may be used to predict a corresponding increase in sales, based on historical reactions to such sales. The historical data 185 is also used by historical data assessment logic 180, for one embodiment, to evaluate the accuracy of the field assessment, the pipeline logic, and any additional types of assessment logics. For example, the historical assessment logic 180 can evaluate how closely field assessments matched actual performance in the past. For one embodiment, the historical assessment logic 180 can adjust for such factors as seasonality, demographic skew, geographic skew, time series, data anomalies, and data outliers. The results of the historical assessment are also sent to the triangulated forecasting logic 110.

As discussed above, the triangulated forecasting logic 110 uses the three or more perspectives to create a final triangulated forecast. For one embodiment, the triangulated forecasting logic may actually perform a triangulation to arrive at the final forecast. Alternatively, one of the forecasts may be taken as the basis, and adjusted based on the results from the other forecasts. For example, the triangulated forecasting logic 110 may take the field assessment as the basis of a forecast, and adjust it based on the results of the pipeline forecast and the historical assessment. Alternatively, other methods of interpolating between the results to obtain a final forecast may be used.

Figure 2:
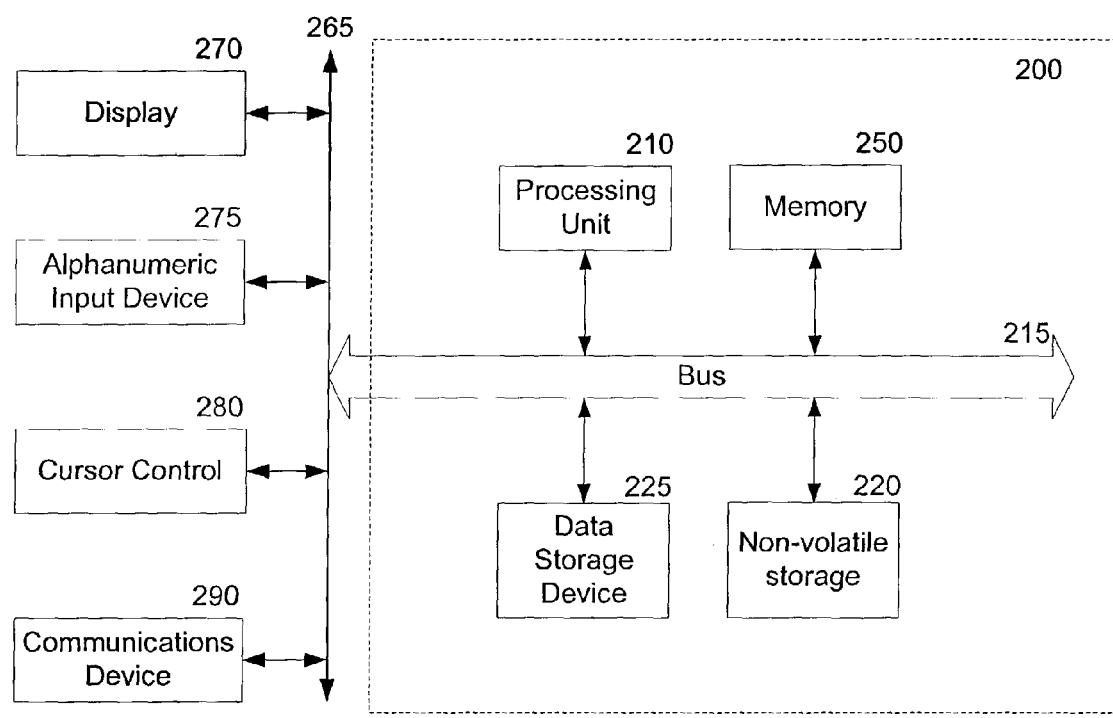
FIG. 2 is a block diagram of a computer system that may be used with the present invention.

FIG. 2 is a block diagram of a computer system that may be used with the present invention. It will be apparent to those of ordinary skill in the art, however that other alternative systems of various system architectures may also be used.

The data processing system illustrated in FIG. 2 includes a bus or other internal communication means 215 for communicating information, and a processor 210 coupled to the bus 215 for processing information. The system further comprises a random access memory (RAM) or other volatile storage device 250 (referred to as memory), coupled to bus 215 for storing information and instructions to be executed by processor 210. Main memory 250 also may be used for storing temporary variables or other intermediate information during execution of instructions by processor 210. The system also comprises a read only memory (ROM) and/or static storage device 220 coupled to bus 215 for storing static information and instructions for processor 210, and a data storage device 225 such as a magnetic disk or optical disk and its corresponding disk drive. Data storage device 225 is coupled to bus 215 for storing information and instructions.

The system may further be coupled to a display device 270, such as a cathode ray tube (CRT) or a liquid crystal display (LCD) coupled to bus 215 through bus 265 for displaying information to a computer user. An alphanumeric input device 275, including alphanumeric and other keys, may also be coupled to bus 215 through bus 265 for communicating information and command selections to processor 210. An additional user input device is cursor control device 280, such as a mouse, a trackball, stylus, or cursor direction keys coupled to bus 215 through bus 265 for communicating direction information and command selections to processor 210, and for controlling cursor movement on display device 270.

Another device, which may optionally be coupled to computer system 200, is a communication device 290 for accessing other nodes of a distributed system via a network. The communication device 290 may include any of a number of commercially available networking peripheral devices such as those used for coupling to an Ethernet, token ring, Internet, or wide area network. The communication device 290 may further be a null-modem connection, or any other mechanism that provides connectivity between the computer system 200 and the outside world. Note that any or all of the components of this system illustrated in FIG. 2 and associated hardware may be used in various embodiments of the present invention.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 210.

It will be apparent to those of ordinary skill in the art that the system, method, and process described herein can be implemented as software stored in main memory 250 or read only memory 220 and executed by processor 210. This control logic or software may also be resident on an article of manufacture comprising a computer readable medium having computer readable program code embodied therein and being readable by the mass storage device 225 and for causing the processor 210 to operate in accordance with the methods and teachings herein.

The present invention may also be embodied in a handheld or portable device containing a subset of the computer hardware components described above. For example, the handheld device may be configured to contain only the bus 215, the processor 210, and memory 250 and/or 225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 210, a data storage device 225, a bus 215, and memory 250, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 210. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Figure 3:
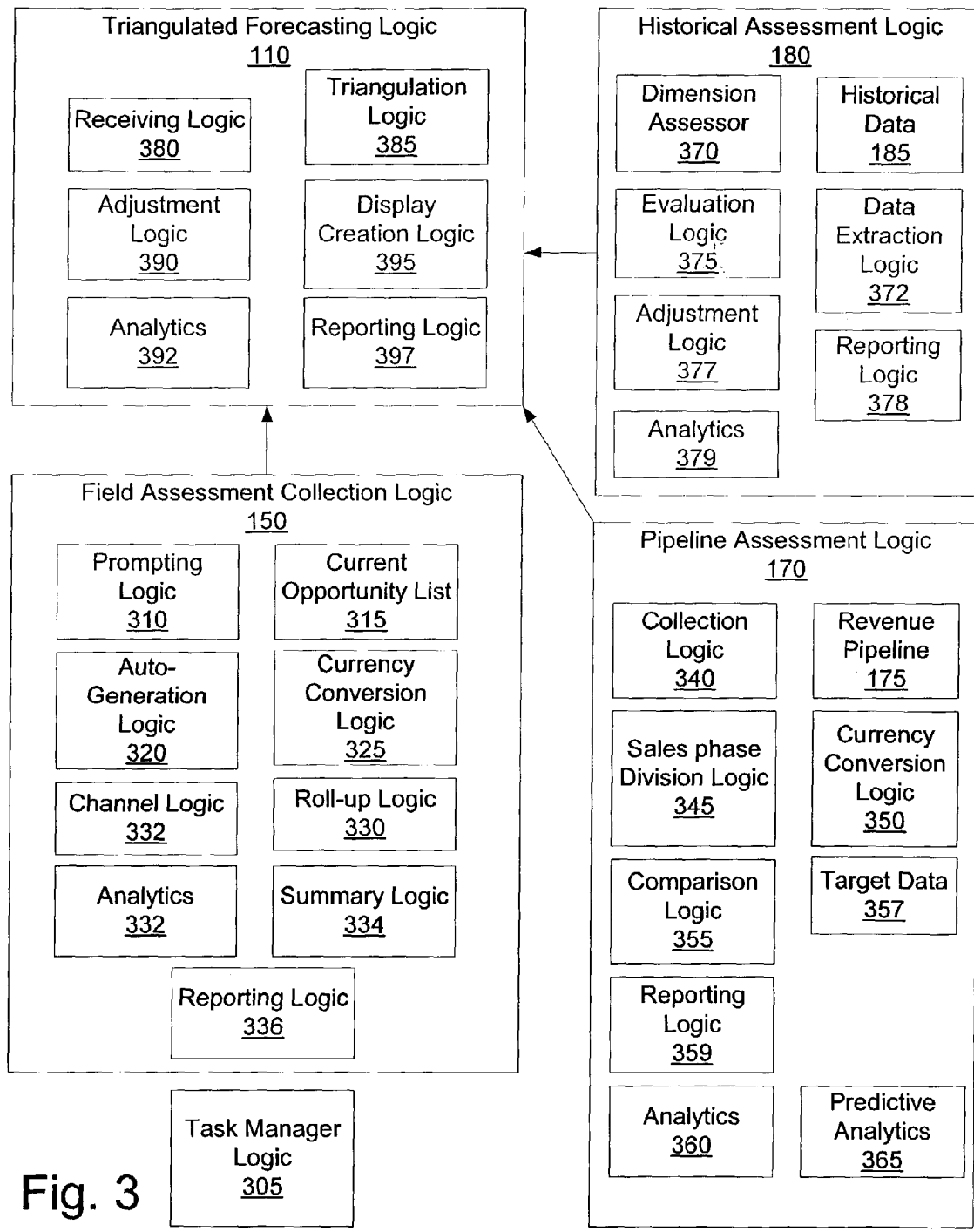
FIG. 3 is a block diagram of one embodiment of a forecasting system.

FIG. 3 is a block diagram of one embodiment of a forecasting system. The system includes a task manager logic 305 to manage the forecasting process. The task manager logic 305 may walk the participants—e.g. sales personnel, managers, supervisors, etc.—through the steps of creating the forecast. For one embodiment, the task manager logic 305 interacts with the field assessment collection logic 150, pipeline assessment logic 170, historical assessment logic 180, and triangulated forecasting logic 110.

The field assessment collection logic 150 includes a prompting logic 310 to prompt the sales staff to perform the assessment. For one embodiment, the prompting logic 310 is initiated automatically, based on a schedule, or manually by an appropriate individual.

The current opportunity list 315 provides a list all the known opportunities, and permits the user to enter additional details. For example, the current opportunity list 315 shows lists the currently recorded opportunities, the value of the opportunity, the stage of the opportunity, and the likely closing date of the opportunity. The current opportunity list 315, for one embodiment, prompts the sales representative to verify/enter "expected" data for the value, stage, closing date, etc. Additionally, the user may be prompted to enter "worst case" and/or a "best case" data as well. This may be used to provide a range of data, based on various scenarios. This data is then passed on to the user's manager, using roll-up logic 330.

Roll-up logic 330 passes the data generated by each sales person, and then each manager, to the next higher supervisor. For one embodiment, if appropriate, the roll-up logic 330 passes the data through currency conversion logic 325. Currency conversion logic 325 converts the amounts for each opportunity into the local currency of the individual currently reviewing the file. This permits each sales representative to enter opportunity values in the appropriate currency, and yet permits the manager to easily compare opportunities.

For one embodiment, if roll-up logic 330 determines that one or more sales representatives have not completed their work, auto-generation logic 320 may be invoked, to automatically generate an evaluation of the opportunities of these sales agents, for the roll-up. This assures that the manager receives a complete view of the opportunities available. For one embodiment, auto-generation logic 320 uses analytics 332 to make this evaluation. Analytics 332 provide historical data and evaluate current opportunities in light of historical data. The historical data may be for the same sales representative, for the same time-period, for the same customer, and/or for the same products. Analytics 332 provides this historical perspective, for one embodiment, to sales representatives as well, to permit them to evaluate the historical comparisons to their current opportunity evaluation.

For one embodiment, roll-up logic 330 further interacts with summary logic 334, to create a summarized opportunity list for the manager. This provides an overview, and permits the manager to understand the overall status of the opportunities in the manager's domain. Furthermore, the manager may add current opportunities within the manager's purview.

Channel logic 332 makes the field assessment collection logic 150 available to other channels. For one embodiment, channel logic 332 receives an evaluation from other channels, and converts it into the proper format for roll-up within the field assessment collection logic 150. For one embodiment, the channel logic 332 may use the same elements described above, to auto-generate, currency convert, and roll-up data collections.

Reporting logic 336 produces a coherent report, based on the rolled-up and summarized data. For one embodiment, the reporting logic 336 creates a coherent report, with end results. For one embodiment, the report may further provide access to the underlying detailed data upon request. The report from the field assessment collection logic 150 is passed to the triangulated forecasting logic 110.

The pipeline assessment logic 170 is also triggered by task manager logic 305. The revenue pipeline 175 is constantly maintained by the system. Collection logic 340 collects the pipeline data for the appropriate time frame, as defined by the task manager logic 305. The sales phase division logic 345 divides the revenue pipeline data into sales phases, if the pipeline assessment is for a sales cycle. Currency conversion logic 350 converts all opportunities in the revenue pipeline into a single common currency.

Comparison logic 355 uses analytics 360 and predictive analytics 365 to determine the relationship of the current opportunities in the pipeline to the expected state of the opportunities. Analytics 360 uses historical data to determine trends and sales coverage. Predictive analytics 365 identifies opportunities with similar profiles, and uses the data about such opportunities to evaluate the current opportunities in the pipeline. The comparison logic 355 identifies the percentage coverage in each pipeline segment, compared to the target data 357. For one embodiment, target data 357 is set by the management, and may be in the form of specific numbers and values of opportunities at each pipeline stage, at the end of the week, quarter, year, or other time unit. Target data 357 may also be set by the value of opportunities closed by a certain date.

Figure 9:
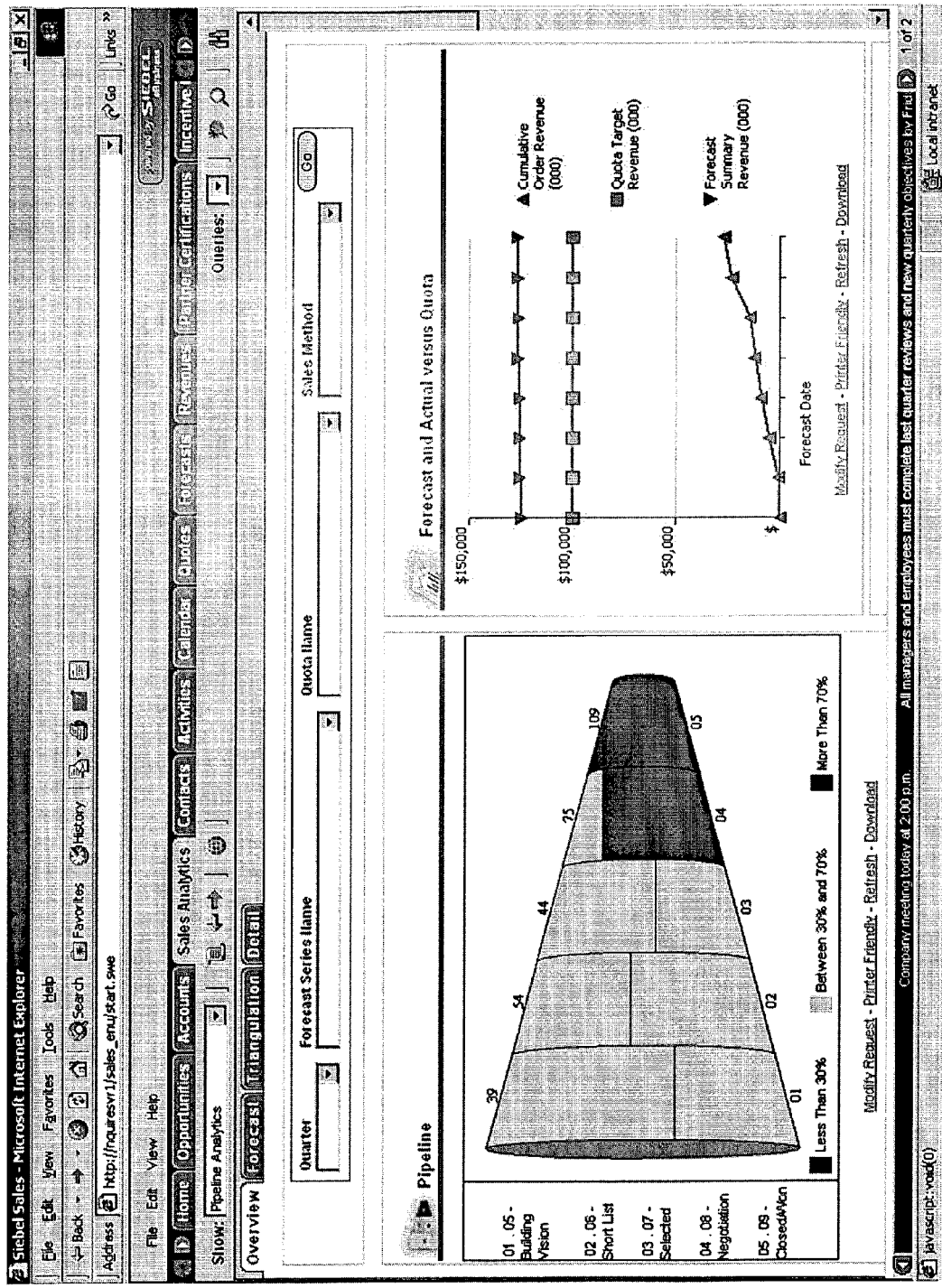
FIG. 9 illustrates one embodiment of a user interface that may be used with the present invention to display the triangulated forecast.

Reporting logic 359 creates the pipeline report, showing the current state of the pipeline, as well as the comparison to the target data 357. For one embodiment, the reporting logic 359 may create a visual representation of the pipeline data, as is shown in FIG. 9 below. The output of reporting logic 359 is passed to triangulated forecasting logic 110.

Historical assessment logic 180 includes historical data 185. This historical data 185 may be stored in a data warehouse or transactional database.

Dimension assessor 370 determines the dimensions of the current evaluation. When the original request for a forecast is made using task manager logic 305, a timeframe, and possibly other parameters of the evaluation are set. The timeframe may be a week, month, quarter, year, or any length of time. The other parameters may specify that the forecast should only involve certain product lines, certain geographic areas, or any other restrictions which may be defined by the system. The dimension assessor 370 determines the search parameters, to obtain the appropriate reference data from historical data 185. Data extraction logic 372 may extract portions of the relevant data.

Analytics 379, as noted above, uses historical data and trends to analyze sales coverage, and evaluate the current data against historical information.

Reporting logic 378 creates a coherent report of the historical assessment, indicating what the historical assessment is, and any suggested adjustments. The report is then passed to the triangular forecasting logic 110.

The triangular forecasting logic 110 receives the reports from each of the other, three or more, forecasting logics, with receiving logic 380.

Triangulation logic 385 uses the three or more assessments to create a triangulated final assessment. Thus, the field assessment and triangular assessment are compared against each other, and against the historical assessment, to correct for any errors in any of the assessments. Adjustment logic 390 permits the person viewing the triangulated forecast to make manual adjustments to the results. Analytics 392 compares the results of the triangulation to historical data to evaluate accuracy, completeness, trends, and coverage.

Reporting logic 397 creates a coherent report of the triangulated results. Display creation logic 395 creates a unified display, which shows the triangulated forecast, and may further show the assessments that form the basis of the triangulated forecast. For one embodiment, the display and report further provide access to the individual assessments.

Although analytics are shown as separate logic blocks associated with each forecasting type, a single analytics engine may be used by each of the analytics logics. Alternatively, separate analytics engines may be used for each type of assessment, each analytics engine specialized for the assessment type.

Figure 4:
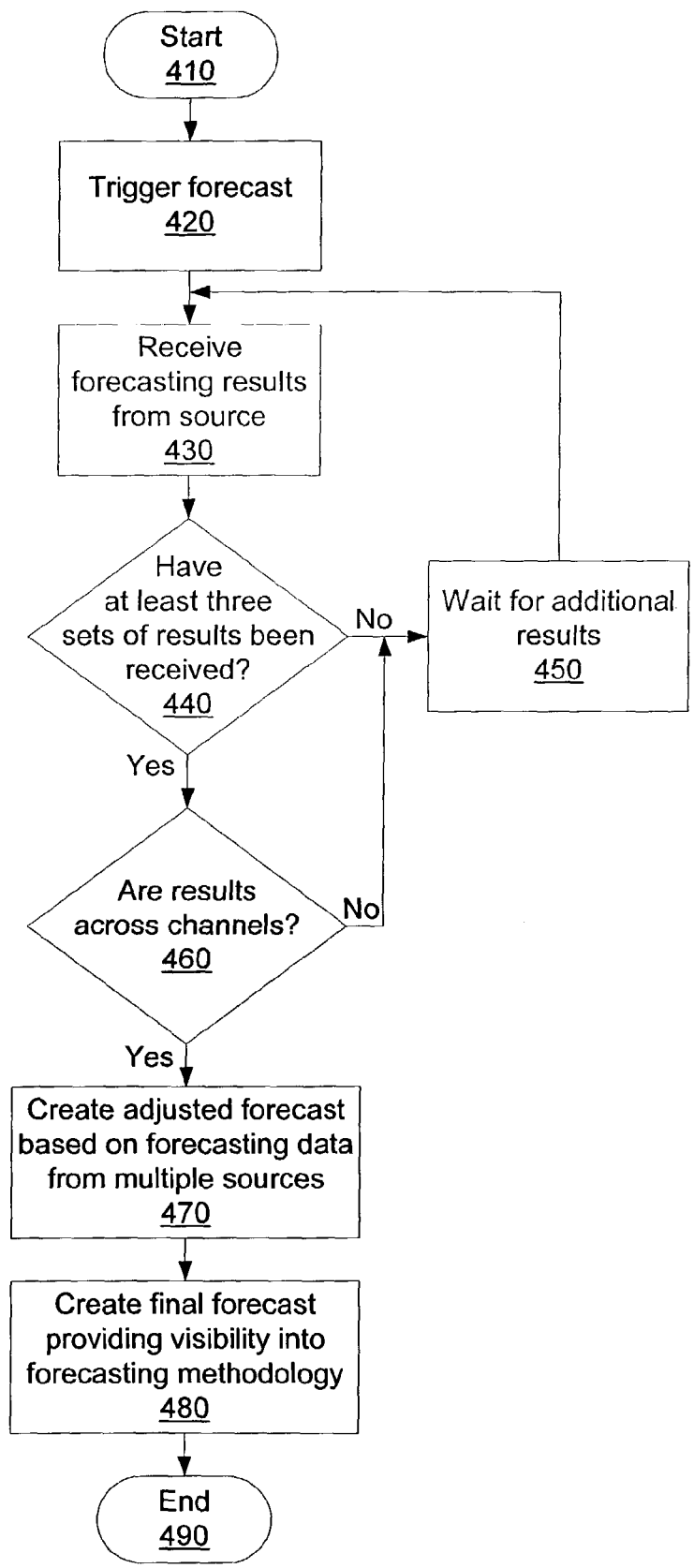
FIG. 4 is a flowchart of one embodiment of generating a triangulated forecast of the present invention.

FIG. 4 is a flowchart of one embodiment of generating a triangulated forecast of the present invention. The process starts at block 410. At block 420, a forecast is triggered. For one embodiment, a forecast is triggered regularly, for example twice a quarter. This would provide a beginning-of-quarter estimate as well as an end-of-quarter evaluation to see how close to the beginning of quarter estimate the company is. For one embodiment, the present integrated system reduces the time for completing a forecast from 5-7 days to approximately ½ day. This provides a very fast way of evaluating performance within an organization, and avoids last minute panics.

At block 430, forecasting results are received. For one embodiment, triggering the forecast triggers the system to generate any internal forecasts, such as pipeline forecasts and historical evaluations. For one embodiment, if there are partners outside the company whose data would be relevant, triggering the forecast also sends a notification to the partners to start the forecasting procedure.

At block 440, the process determines whether at least three sets of results have been received. The system triangulates between three or more sales forecasting methodologies. Therefore, it requires at least three sets of results. If three sets of results have not yet been received, the process waits for additional results at block 450, and returns to block 430, to receive additional results.

If at least three forecasts have been received, the process continues to block 460. At block 460, the process determines whether the forecasts extend across channels. For one embodiment, at least one of the forecasts should encompass channels outside the traditional sales representative. For example, the channels encompass one or more of the following: distributors, partners, telesales, retailers, field sales personnel, and others who may contribute to the revenue stream. For one embodiment, the channels further encompass revenue types such as product sales, services, maintenance contracts, and recurring revenues. If the results are not across channels, the process returns to block 450 to await further results. Note that single channel companies may set up the process to skip this step.

If the results are across channels, or this step was skipped, the process at block 470 creates an adjusted forecast based on the forecasting data from the multiple sources. At block 480, the final forecast is created. The final forecast, for one embodiment, provides visibility into the forecasting methodology, each of the sources, each of the channels, etc. For one embodiment, the visibility provides the ability to drill down to the individual contributor level, or to a particular product group or individual product or service. This type of visibility creates a useful forecast because the viewer of the final forecast can see each of the components that created it. It also means that if the forecast indicates that there will be a shortfall, e.g. that sales will not meet the targets set, the viewer can determine in what area(s) the problems lie. The process then ends at block 490.

Figure 5A:
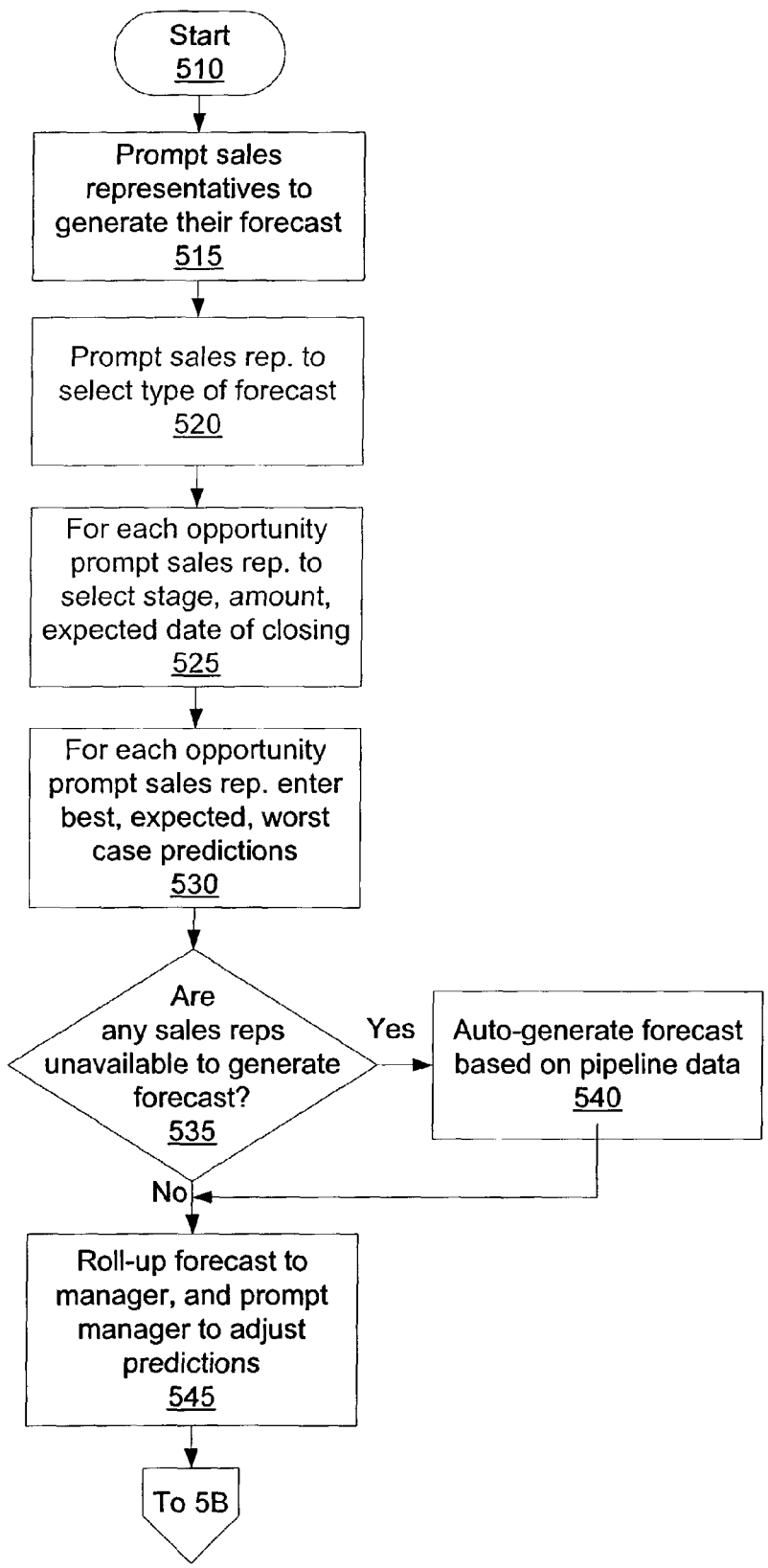
FIGS. 5A and 5B are flowcharts of one embodiment of generating the field assessment.
Figure 5B:
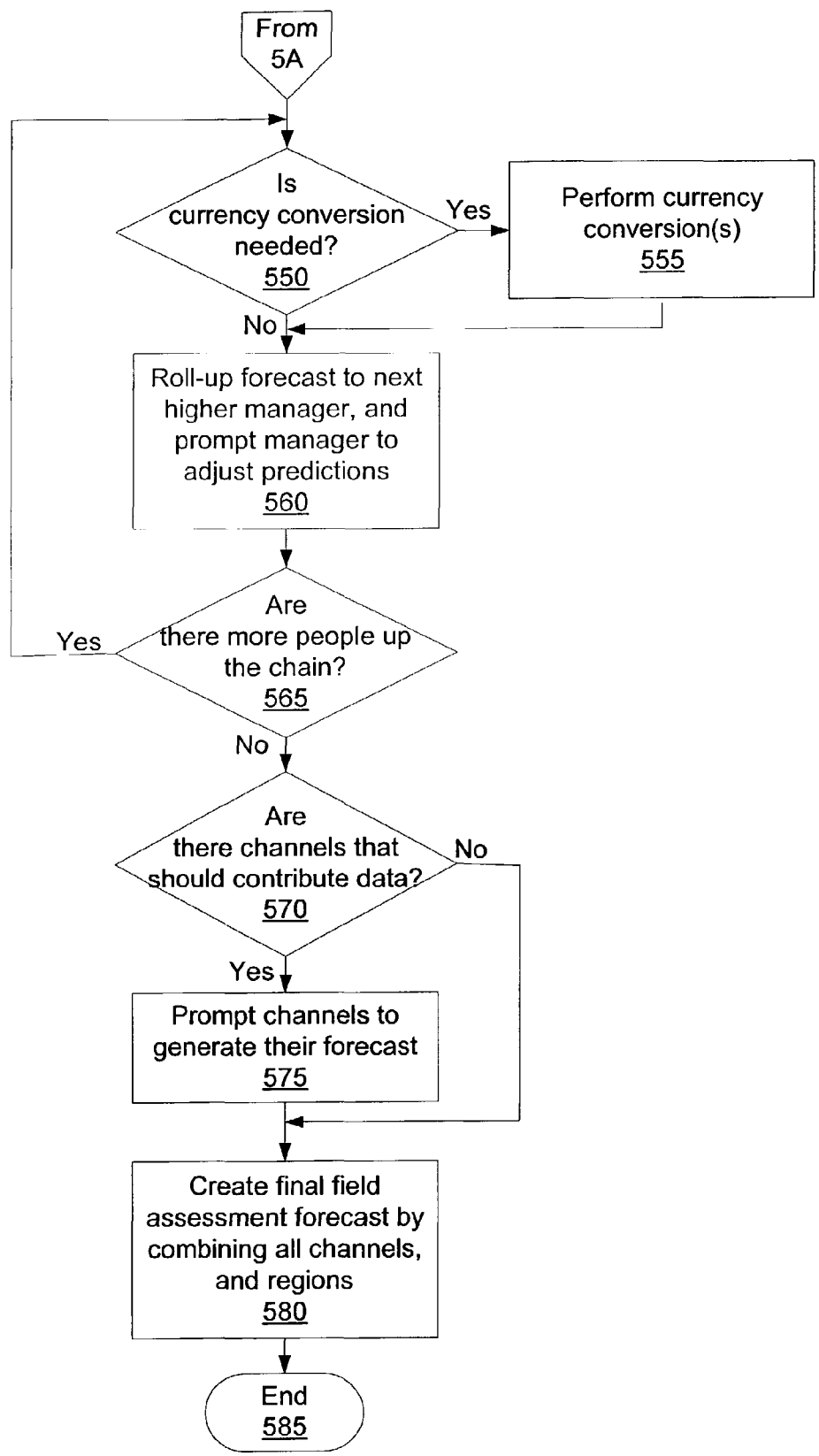
Figure 6:
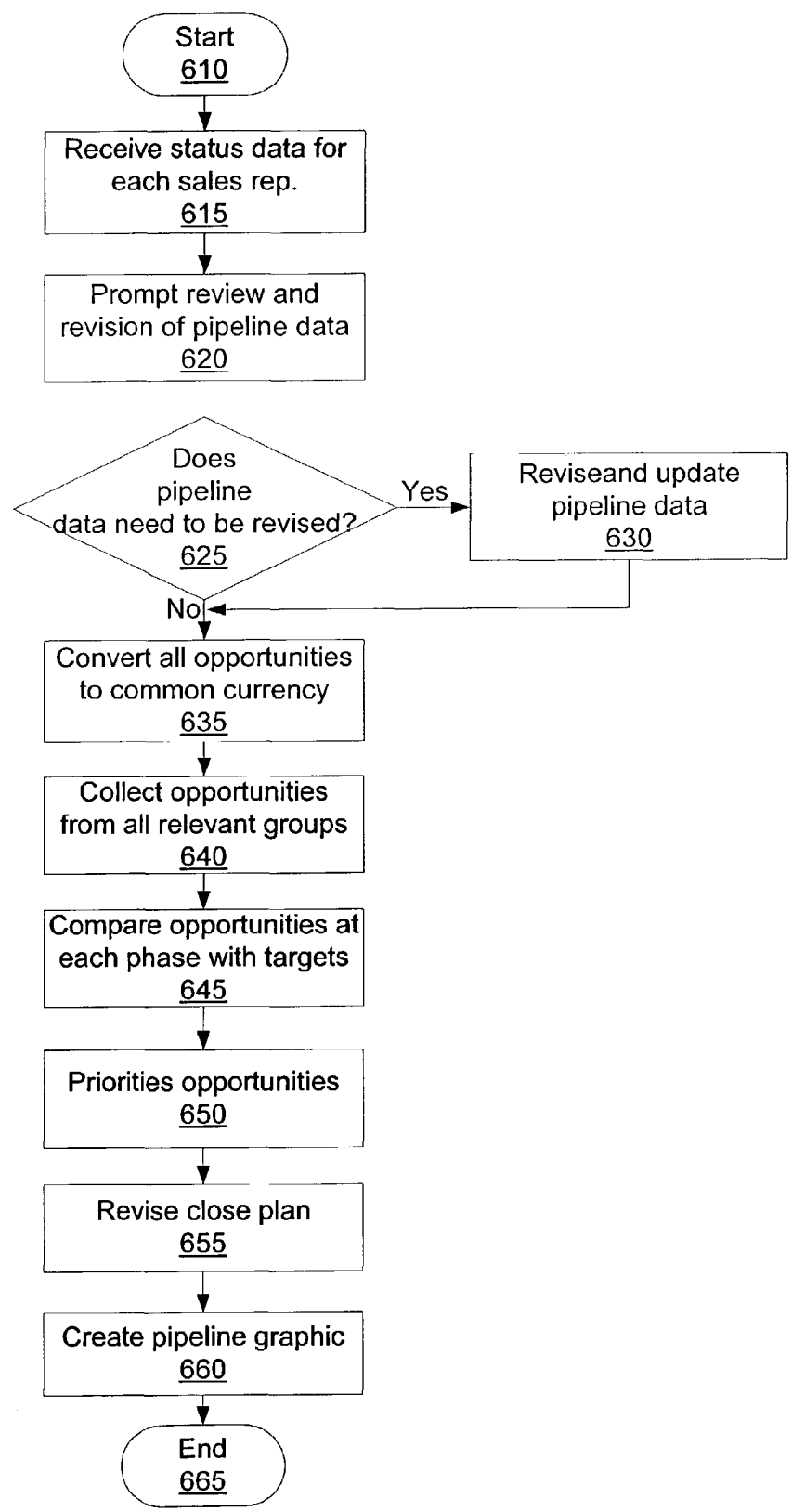
FIG. 6 is a flowchart of one embodiment of generating the pipeline assessment.
Figure 7:
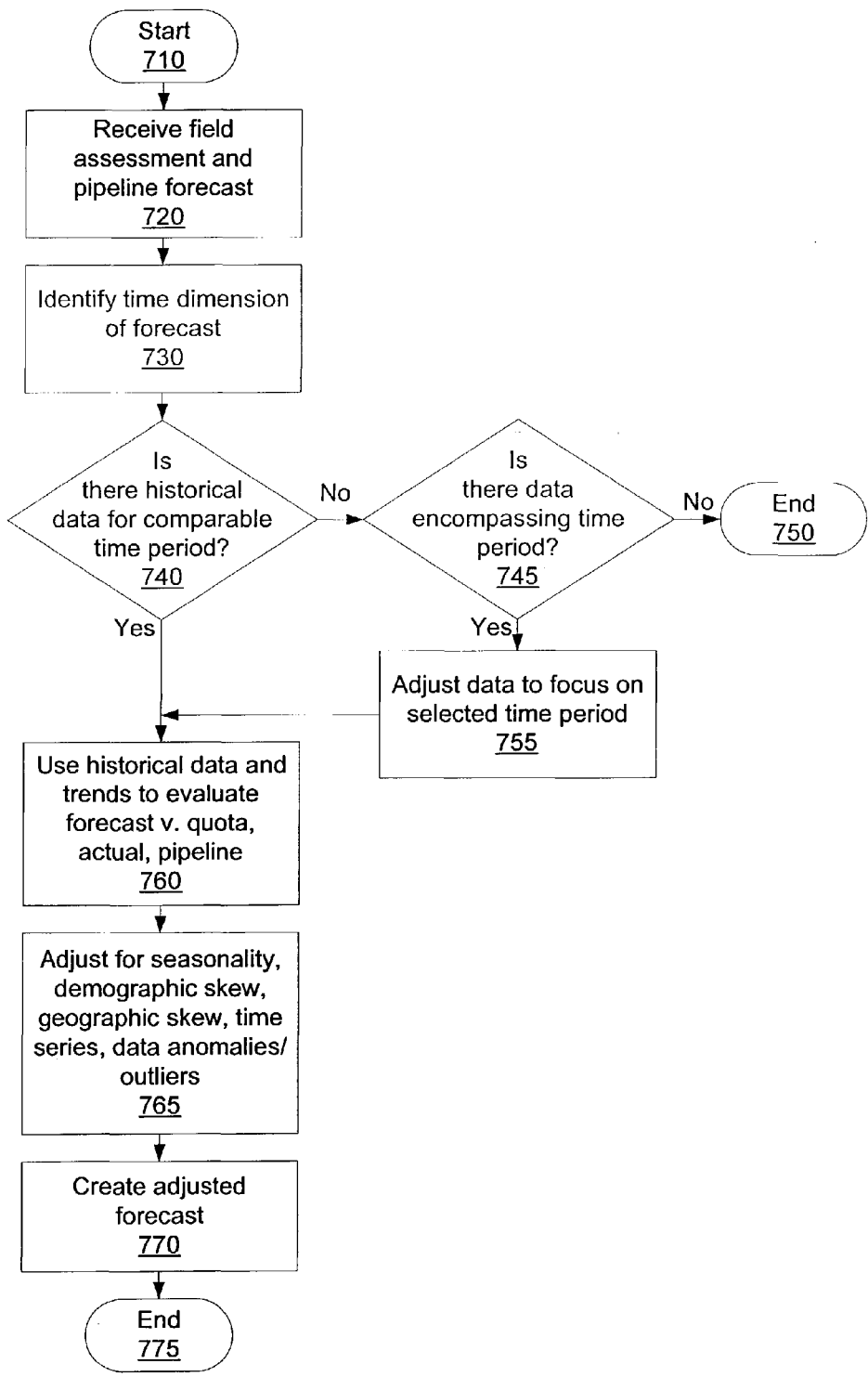
FIG. 7 is a flowchart of one embodiment of generating the historical assessment.

FIGS. 5-7 illustrate three particular forecasting methods that may be used to form the sales forecasts used to create the triangulated forecast. Please note that these particular forecasting methodologies are only exemplary.

FIG. 5 is a flowchart of one embodiment of generating a field assessment. The process starts at block 510, when it is triggered. At block 515, the sales representatives are prompted to generate their forecast. At block 520, the type of forecast is selected. For one embodiment, the trigger may select this automatically. For another embodiment, the sales representative may be prompted to select the appropriate type of forecast. Forecast types can include: periodic (e.g. annual, quarterly, etc.), product line based, target company based, etc.

At block 525, for each opportunity, the sale representative is prompted to select the stage, amount, and expected date of closing. For one embodiment, in the integrated system, each sales representative is shown the list of currently existing opportunities for which the sales representative is responsible. The sales representative can then interact with each of the opportunities, selecting the details.

At block 530, for one embodiment, the sales representative is prompted to enter the best, expected, and worst case predictions. For one embodiment, the best and worst case predictions are requested for the expected date of closing and the amount of the contract.

At block 535, the process determines whether there are any sales representatives who are unable to generate a forecast. Sales representatives may not be available, due to travel, illness, or other reasons. Since the forecasting process is highly accelerated, the system cannot wait for an unavailable sales representative.

Therefore, if there are unavailable sales representatives, the process, at block 540, auto-generates a forecast for each unavailable sales rep. For one embodiment, such auto-generated forecasts are appropriately flagged so that reviewers are aware that the forecast was automatically generated. For one embodiment, the system uses the previous forecast from the sales representative, the list of current opportunities, and predictions based on historical data to determine the expected state of the opportunities. The process then continues to block 545. If all sales representatives are accounted for, the process continues directly to block 545.

At block 545, the forecast is rolled up to the manager. The manager is prompted to make any adjustments to the forecasts made by the sales reps under his or her supervision. Note that this process occurs across the board, with each manager reviewing the forecasts of the sales reps working for the manager. Furthermore, the system may direct the manager's attention to the automatically generated forecasts.

At block 550, the process determines whether currency conversion is needed. For one embodiment, a manager may supervise sales reps who operate in different countries using different currencies. For one embodiment, the system determines whether currency conversion is needed by evaluating the currency in which the manager receiving the data operates. For one embodiment, this information may be associated with the manager's identity. For another embodiment, this information may be a function of the manager's location. The manager located in Japan will be expected to operate in Yen, while the manager in Europe will be expected to want the data in Euros. The field assessment permits the sales rep to enter the expected value of a contract in the local currency. This eliminates the need for tedious currency conversions. If currency conversion is needed, the process, at block 555, performs a currency conversion.

For one embodiment, the currency conversion occurs prior to the manager seeing the data. Thus, the manager always receives all of the data from all of the sales reps in a single currency that is logical to the manager.

At block 560, the forecast is rolled up to the next higher manager, and that manager is permitted to adjust the predictions.

At block 565, the process determines whether there are more people up the chain, who should review the forecast. If so, the process returns to block 550, to determine whether the next higher manager requires a currency conversion. If there are no more levels, the process continues to block 570.

Note that this process starts out with a group of sales representatives sending their individual forecasts to their manager. That manager, and other managers, send their forecast in turn to their superior. This process continues up the chain, to the appropriate level. For one embodiment, the forecast may be triggered by a local high level manager, and only impact the individuals within the organization of the requested. In that case, the forecast is only rolled up to the requesting manager. For a company-wide forecast, there is a designated highest level, to which the forecast is sent.

At block 570, the process determines whether there are additional channels who should contribute data, and whose data has not yet been received. If so, the process at block 575, reminds the channels to generate their data and send it. As noted above, generally when the initial forecast is triggered, the partners and other channels outside the system are notified to also perform the forecast. For one embodiment, the partners and other channels also use the same integrated system. However, they may perform their forecast as a remote function, and synchronize their results to the main system. This permits the full range of data to be received from the partners/channels. However, it provides the ability for the partner to perform the forecast while not being directly connected to the network of the company.

At block 580, a final field assessment is created by combining all channel and region data. This field assessment is sent on to the triangulated assessment logic, as discussed above. The process then ends at block 585.

FIG. 6 is a flowchart of one embodiment of generating a pipeline assessment. The process starts at block 610. This process is triggered by the request for the forecast.

At block 615, sales data is received for each opportunity. For one embodiment, this data is separately maintained, as a list of current opportunities and stages for each opportunity. For one embodiment, each sales representative is required to maintain the up-to-date sales data for each opportunity, at each stage. At block 615, the process retrieves the most recent set of data.

At block 620, the process prompts the individual reviewing the sales data to review any inaccuracies in the pipeline data. For one embodiment, the pipeline data is reviewed by the sales representatives and the responsible managers. For one embodiment, sales operations also reviews the pipeline data. For one embodiment, these individuals may make adjustments to the pipeline data for which they are directly or indirectly responsible.

At block 625, the process determines whether the data was updated by one or more of the reviewers, at block 620. If so, the process continues to block 630. At block 630, the pipeline is updated. The process then continues to block 635.

At block 635, all opportunities are converted to a single common currency. As discussed above, each sales representative is permitted to maintain the opportunities in the local currencies. However, the forecast requires uniformity.

At block 640, the opportunities at each sales phase are collected. For one embodiment, all portions of the corporation and relevant channels have identical phase divisions. The consistency of definition of each stage is useful. However, for another embodiment, the system processes each of the opportunities, and if stages are differently defined, aggregates the opportunities into the preferred predefined stages.

At block 645, the process, at each stage, compares the opportunities with the targets. For one embodiment, management sets targets, such as sales quotas. For one embodiment, management sets separate targets for each stage. The process compares the actual opportunities at each stage to the targets.

At block 650, the items in the pipeline are priorities based on various qualities. For one embodiment, the items may be prioritized based on the amount, expected closing date, significance of customer, or any other set of preferences set by the user.

At block 655, the close plan is revised, based on the priorities and any changes made by the reviewers. This close plan can then be used to prioritize critical opportunities, to make sure that the appropriate level of attention is paid to important deals.

At block 660, the process creates a color-coded pipeline graphic to illustrate opportunities at each stage. This step may be skipped, in the alternative. FIG. 9 illustrates the user interface of the final estimate that includes the pipeline 930. As can be seen, each stage 9350 is shown, with the level of opportunity 940 indicated. For one embodiment, color codes 945 may be used to indicate whether the opportunity level at the stage is good, acceptable, or poor. Of course, additional colors may be used, to split the evaluation into finer gradations. This visual aid provides an easy overview to the entire opportunity stream. For one embodiment, generating the graphic may be skipped, and the pipeline data may be simply passed to the triangulated forecast logic, as discussed above. The process then ends at block 665.

FIG. 7 is a flowchart of one embodiment of generating a historical assessment. The process starts at block 710. For one embodiment, this process uses other field assessments, and thus is started when a newly generated field assessment is received.

At block 720, a field assessment, pipeline forecast, or other forecast is received.

At block 730, the time dimension of the forecasts is identified. The time dimension may range from less than a quarter to multiple years.

At block 740, the process determines whether there is historical data for a comparable time period. As discussed above, if historical data is in a different system, ranging from simple spreadsheets to a data repository, the present system can remap it to make it available as historical data. Therefore, if the corporation has any data available, regardless of the original format, the process would find it and be able to use it for the historical evaluation. If there is historical data, the process continues directly to block 760.

If there is no historical data for a comparable time period, the process continues to block 745. At block 745, the process determines whether there is data that encompasses the time period. For example, if the company previously only used annual forecasting, and now is switching to a quarterly forecasting system, the previous annual forecast encompasses all of the quarters. If there is no encompassing data, in general this means there is no data available at all, the process ends at block 750. Otherwise, the process continues to block 755.

At block 755, the data is adjusted and trimmed to focus on the selected time period. For one embodiment, the dates of various contracts are used to trim the data. Alternatively, the data may be simply divided into quarters, months, or appropriate units. Alternative methods of dividing up the data may be used. The process then returns to block 760.

At block 760, the historical data and trends are used to evaluate the forecasts versus targets. For one embodiment, each forecast can be compared against historical values, historical forecasts, and other forecasts. The historical evaluation is designed to detect trends such as: field assessments are generally 15% optimistic at this stage; when the pipeline is filled in this way, the quota will be met this year; etc.

At block 765, the historical assessment adjusts for various factors. These factors may include seasonality, demographic skew, geographic skew, time series, the economy, and other factors that may impact the relevance of the historical data. For one embodiment, the process also eliminates data anomalies and outlying data points, and any factors that may impact the accuracy of the historical data.

At block 770, the adjusted historical evaluation is created. As noted above, this data is sent to the triangulated forecast logic. The process then ends at block 775.

Figure 8:
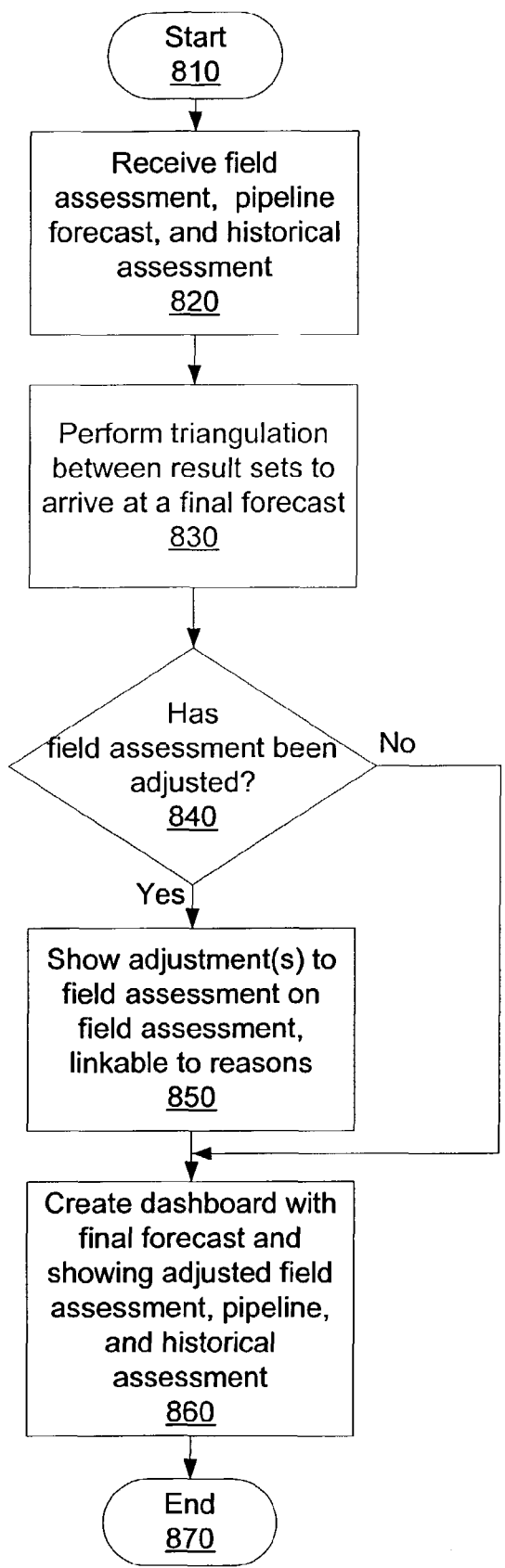
FIG. 8 is a flowchart of one embodiment of integrating the various assessments to generate a final forecast.

FIG. 8 is a flowchart of one embodiment of integrating the various assessments to generate a final forecast. The process starts at block 810. At block 820, the three or more assessments are received. As discussed above, in this example the three assessments may be a field assessment, a pipeline forecast, and a historical assessment.

At block 830, triangulation is performed between the result sets to arrive at a final forecast. As noted above, the triangulation process may use one forecast as the basis, and adjust it based on the other forecasts. Alternatively, the triangulation may use an averaging to arrive at a final forecast. Alternatively, the triangulation may triangulate based on the forecasts. Alternatively, any other mathematical function may be used to define a final forecast.

At block 840, the process determines whether the field assessment has been adjusted. If so, at block 850, the adjustments to the field assessment are shown. For one embodiment, the process includes the logic behind the adjustments as well. This creates additional visibility for a user. The process then continues to block 860. If the field assessment was not adjusted, the process continues directly to block 860.

At block 860, the process creates a dashboard with the final forecast, showing the adjusted field assessment, the pipeline, and the historical assessments. FIG. 9 illustrates one example of such a dashboard. This interactive dashboard provides an overview of the triangulated forecast, as well as the ability to drill down into the details of the final forecast, as well as the forecasts that were used to generate the final forecast. This type of visibility means that the manager can see where goals are not being met, and can directly evaluate the performance of groups. The process ends at block 870.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-implemented method comprising:
   receiving a plurality of at least three sales forecasts wherein the plurality of sales forecasts comprises a first sales forecast of a first type, a second sales forecast of a second type, and a third sales forecast of a third type, the first type, the second type, and the third type are each of a type from the group consisting of: a field assessment type, a pipeline forecast type, and a historical forecast type, forecasts of the field assessment type are based at least in part on a plurality of current sales opportunities, forecasts of the pipeline forecast type are based at least in part on sales opportunities at a plurality of stages in a sales process, and comparisons of the sales opportunities at each of the plurality of stages with corresponding targets for each of the plurality of stages, and forecasts of the historical forecast type are based at least in part on historical data from a system that stores historical sales information;

adjusting, using a computer processor, the first sales forecast to produce a triangulated forecast, wherein the adjusting the first sales forecast is performed in response to the second sales forecast and in response to the third sales forecast, and the adjusting the first sales forecast comprises performing an error correction by comparing the first sales forecast to the second sales forecast, and determining an accuracy of at least two of the plurality of sales forecasts based at least in part on the historical sales information; and storing the triangulated forecast in a memory.

2. The computer-implemented method of claim 1, wherein the sales forecasts comprise a first field assessment.

3. The computer-implemented method of claim 2, wherein the first field assessment further comprises an assessment from at least one of a partner, a channel, and a call center.

4. The computer-implemented method of claim 2, further comprising:

making the first field assessment, wherein the making comprises displaying a plurality of current opportunities to a sales representative; and prompting the sales representative to identify, for each of the current opportunities, a current stage, an expected closing date, and an amount.

5. The computer-implemented method of claim 4, further comprising:

if the sales representative is not available to make the first field assessment on schedule, auto-generating the first field assessment for the sales representative, based at least in part on each of the current opportunities.

6. The computer-implemented method of claim 3, further comprising:

submitting the first field assessment to a manager; and permitting the manager to make alterations to field assessments of each sales representative in a group of the manager.

7. The computer-implemented method of claim 6, further comprising:

automatically performing a currency conversion into a local currency.

8. The computer-implemented method of claim 1, wherein the sales forecasts comprises a first pipeline forecast.

9. The computer-implemented method of claim 8, further comprising:

making the first pipeline forecast, wherein the making comprises calculating sales opportunities at a plurality of stages in the sales process;

comparing the sales opportunities at each of the plurality of stages with corresponding targets for each of the plurality of stages; and generating the first pipeline forecast showing the relationship of the sales opportunities and the corresponding targets.

10. The computer-implemented method of claim 9, further comprising:

generating a visual display of a pipeline, comprising visual indications of whether at least one of the targets is met.

11. The computer-implemented method of claim 1, wherein the sales forecasts comprise a first historical forecast from the system that stores historical sales information.

12. The computer-implemented method of claim 11, further comprising:

making the first historical forecast, wherein the making comprises selecting a time period, retrieving historical data from the system that stores historical sales information, comparing each of the sales forecasts to the historical data, and determining an accuracy of each of the sales forecasts based at least in part on the historical data.

13. The computer-implemented method of claim 12, further comprising:

adjusting the historical data for one or more of the following: seasonality, demographic skew, geographic skew, time series, data anomalies, and data outliers.

14. The computer-implemented method of claim 1, wherein:

the sales forecasts and the triangulated forecast are generated by a common computing system.

15. The computer-implemented method of claim 1, further comprising:

adjusting the sales forecasts based at least in part on seasonality; and adjusting the sales forecasts for data outliers.

16. The computer-implemented method of claim 1, wherein the sales forecasts comprise accounting for recurring revenues.

17. A computer-implemented method comprising:

generating a forecast, wherein the generating the forecast comprises prompting personnel to generate a field assessment, wherein the field assessment is based at least in part on a plurality of current sales opportunities, generating a pipeline assessment, wherein the pipeline assessment is based at least in part on sales opportunities at a plurality of stages in a sales process, retrieving historical data from a system that stores historical information, generating a historical evaluation, based at least in part on the historical data, of one or more of the field assessment or the pipeline assessment, wherein the generating the historical evaluation comprises determining, based at least in part on the historical data, an accuracy of the field assessment and an accuracy of the pipeline assessment, and creating, using a computer processor, a triangulated final assessment based at least in part on the field assessment, the pipeline assessment, and the historical evaluation, wherein the creating is usable by a user interface to display information, and the information is based at least in part on the triangulated final assessment; and storing the triangulated final assessment in a memory.

18. The computer-implemented method of claim 17, wherein the assessments are multi-channel and cover potential income sources, comprising partners, channels, call centers, services, maintenance fees, and recurring revenues.

19. The computer-implemented method of claim 1, wherein the triangulated forecast provides visibility into each of the sales forecasts, down to data of each of a plurality of sales representative.

20. The computer-implemented method of claim 1, further comprising:

creating a combined output display that comprises visual representations of the triangulated forecast, and the at least three sales forecasts; and permitting a user to view details of each of the at least three sales forecasts.

21. The computer-implemented method of claim 1, wherein the triangulated forecast is configured to provide access to each of the sales forecasts by virtue of being configured to provide transparency at any level of the sales forecast.

22. The computer-implemented method of claim 1, wherein the performing the error correction further comprises:

comparing a field assessment to a pipeline assessment; and
comparing the pipeline assessment to a historical assessment.

23. A system comprising:

a memory;

a computer processor configured to execute instructions stored in the memory, wherein the instructions are executable for generating a triangulated forecast, wherein the generating the triangulated forecast comprises generating at least three sales forecasts comprising a field assessment, a pipeline assessment, and a historical assessment, wherein the field assessment is based at least in part on a plurality of current sales opportunities, the pipeline assessment is based at least in part on sales opportunities at a plurality of stages in a sales process, and the historical assessment is based at least in part on historical data from a system that stores historical sales information, and performing an error correction by comparing the field assessment to the historical assessment, and determining an accuracy of at least two of the at least three sales forecasts based at least in part on historical sales information; and means for generating an output, wherein the means for generating the output is coupled to the computer processor, the means for generating the output is configured to create a combined output display based at least in part on the error correction, and the combined output display comprises visual representations of the triangulated forecast, and each of the at least three sales forecasts.

24. A computer-readable medium comprising:

a computer-readable storage medium;

instructions encoded on the computer-readable storage medium and executable by a computer processor for generating a triangulated forecast, wherein the generating the triangulated forecast comprises acts of receiving a plurality of at least three sales forecasts wherein the plurality of sales forecasts comprises a first sales forecast of a first type, a second sales forecast of a second type, and a third sales forecast of a third type, the first type, the second type, and the third type are each of a type from the group consisting of: a field assessment type, a pipeline forecast type, and a historical forecast type, forecasts of the field assessment type are based at least in part on a plurality of current sales opportunities, forecasts of the pipeline forecast type are based at least in part on sales opportunities at a plurality of stages in a sales process, and comparisons of the sales opportunities at each of the plurality of stages with corresponding targets for each of the plurality of stages, and forecasts of the historical forecast type are based at least in part on historical data from a system that stores historical sales information; and adjusting, using the computer processor, the first sales forecast to produce a triangulated forecast, wherein the adjusting the first sales forecast is performed in response to the second sales forecast and in response to the third sales forecast, and the adjusting the first sales forecast comprises performing an error correction by comparing the first sales forecast to the second sales forecast, and determining an accuracy of at least two of the plurality of sales forecasts based at least in part on the historical sales information.

25. The computer-readable medium of claim 24, wherein the triangulated forecast is configured to provide access to each of the sales forecasts by virtue of being configured to provide transparency at any level of the sales forecast.

26. The computer-implemented method of claim 2, further comprising:

receiving and applying manual adjustments to the adjusted first sales forecast.

27. The computer-implemented method of claim 4, further comprising:

if the sales representative has not on schedule completed the first field assessment, auto-generating the first field assessment for the sales representative, based at least in part on a previous field assessment from the sales representative.

28. The computer-implemented method of claim 9, wherein the making the first pipeline forecast comprises a predictive analysis of a sales opportunity among the sales opportunities, and the predictive analysis is based at least in part on data about sales opportunities that are similar to the first sales opportunity.

29. The computer-implemented method of claim 9, wherein the making the first pipeline forecast comprises analysis using historical data to determine trends and sales coverage.

30. The computer-implemented method of claim 1, further comprising:

generating an evaluation of the triangulated forecast, wherein the generating the evaluation comprises comparing the triangulated forecast to historical data.

31. The computer-implemented method of claim 1, wherein:
the adjusting the first sales forecast comprises eliminating data anomalies from the first sales forecast based at least in part on the second sales forecast.

32. The computer-implemented method of claim 1, wherein:
the adjusting the first sales forecast comprises eliminating outlying data points from the first sales forecast based at least in part on the second sales forecast.

33. The computer-implemented method of claim 1, wherein the sales forecasts comprise a first field assessment, a first pipeline forecast, and a first historical forecast, the method further comprising:
making the first field assessment, wherein the making the first field assessment comprises
displaying a plurality of current opportunities to a sales representative, and
prompting the sales representative to identify a current stage, an expected closing date, and an amount for each of the current opportunities;
making the first pipeline forecast, wherein the making the first pipeline forecast comprises
calculating sales opportunities at a plurality of stages in the sales process,
comparing the sales opportunities at each of the plurality of stages with corresponding targets for each of the plurality of stages, and
generating the first pipeline forecast showing the relationship of the sales opportunities and the corresponding targets; and
making the first historical forecast, wherein the making the first historical forecast comprises
selecting a time period, and
retrieving historical data from a system that stores historical information for a time period comparable to the selected time period.

34. The computer-implemented method of claim 17, wherein the generating the forecast comprises:
displaying a plurality of current opportunities to a sales representative;
prompting the sales representative to identify, for each current opportunity, a current stage, an expected closing date, and an amount;
if the sales representative has not on schedule generated the field assessment, auto-generating the field assessment for the sales representative based at least in part on a previous field assessment from the sales representative;
calculating sales opportunities at a plurality of stages in the sales process;
comparing the sales opportunities at each of the plurality of stages with corresponding targets for each of the plurality of stages;
generating the pipeline assessment based at least in part on a relationship of the sales opportunities and the corresponding targets;
selecting a time period, wherein the historical data corresponds to the time period; and
comparing the field assessment to the historical data.

35. The computer-implemented method of claim 1, wherein the adjusting the first sales forecast comprises:
displaying a plurality of current opportunities to a sales representative;
prompting the sales representative to identify, for each current opportunity,
a current stage,
an expected closing date, and
an amount;
if the sales representative has not on schedule generated a field assessment, auto-generating the field assessment for the sales representative based at least in part on a previous field assessment from the sales representative;
calculating sales opportunities at a plurality of stages in the sales process;
comparing the sales opportunities at each of the plurality of stages with corresponding targets for each of the plurality of stages; and
generating a pipeline assessment based at least in part on a relationship of the sales opportunities and the corresponding targets.

36. A computer-implemented method comprising:
displaying a first opportunity to a sales representative;
prompting the sales representative to identify a first stage, an expected closing date, and an amount for the first opportunity;
obtaining a field assessment in response to the prompting, wherein the field assessment is based at least in part on a plurality of current sales opportunities;
obtaining a historical assessment, wherein the historical assessment is based at least in part on data retrieved from a system that stores historical information;
obtaining a pipeline assessment, wherein the pipeline assessment is based at least in part on sales opportunities at a plurality of stages in a sales process;
determining an accuracy of the pipeline assessment and of the field assessment based at least in part on the historical assessment;
generating, using a computer processor, a triangulated forecast, wherein triangulated forecast is based at least in part on
an error correction based on a comparison of the field assessment to the historical assessment, and
the determined accuracy of the pipeline assessment; and
storing the triangulated forecast in a computer-readable storage medium.

* * * * *